(12) United States Patent
Fan

(10) Patent No.: US 7,988,170 B1
(45) Date of Patent: Aug. 2, 2011

(54) SCOOTER

(75) Inventor: Jeeng-Neng Fan, Taoyuan (TW)

(73) Assignee: Hsin Lung Accessories Co., Ltd., Hsin Chu Hsien (TW)

( * ) Notice: Subject to any disclaimer, the term of this patent is extended or adjusted under 35 U.S.C. 154(b) by 0 days.

(21) Appl. No.: 12/729,502

(22) Filed: Mar. 23, 2010

(30) Foreign Application Priority Data

Feb. 3, 2010 (TW) .............................. 99202168 U

(51) Int. Cl.
*B62M 1/00* (2010.01)
(52) U.S. Cl. ...... 280/221; 280/220; 280/258; 280/87.01
(58) Field of Classification Search .................. 280/210, 280/221, 220, 256, 253, 252, 258, 87.01, 280/97.041

See application file for complete search history.

(56) References Cited

U.S. PATENT DOCUMENTS

| | | | | |
|---|---|---|---|---|
| 5,368,321 A * | 11/1994 | Berman et al. | ................ | 280/221 |
| 6,173,981 B1 * | 1/2001 | Coleman | ...................... | 280/253 |
| 6,659,486 B2 * | 12/2003 | Eschenbach | .................. | 280/221 |
| 7,621,547 B1 * | 11/2009 | Fan | ............................... | 280/221 |
| 7,784,808 B2 * | 8/2010 | Fan | ............................... | 280/221 |
| 2005/0236801 A1 * | 10/2005 | Tal | ................................ | 280/221 |
| 2005/0248117 A1 * | 11/2005 | Hung | .......................... | 280/221 |
| 2007/0114749 A1 * | 5/2007 | Tal | ................................ | 280/221 |
| 2009/0315294 A1 * | 12/2009 | Conti | ........................... | 280/221 |
| 2010/0001487 A1 * | 1/2010 | Pang | ........................... | 280/221 |

* cited by examiner

*Primary Examiner* — Kevin Hurley
*Assistant Examiner* — Tashiana Adams
(74) *Attorney, Agent, or Firm* — Rosenberg, Klein & Lee

(57) ABSTRACT

An improved scooter includes a frame, a front wheel, a rear wheel, a stem, a handle, left and right pedal devices, and left and right first driving devices and second driving device. The left and right first driving devices are driven by the left and right pedal devices respectively for solely or jointly driving the second driving devices, and the driven second driving devices can drive the rear wheel to rotate and roll forward, such that the front and rear wheels can jointly drive the scooter to move forward. Users can pedal the pedal device(s) by one leg or both legs alternately to operate the scooter. The scooter not only complies with the simple, smooth, power-saving, stable and safe ergonomic design, but also comes with a unique operation and driving mode and achieves the effects of providing a recreational sport with fun as well as a transportation tool.

4 Claims, 6 Drawing Sheets

SCOOTER

BACKGROUND OF THE INVENTION

1. Field of the Invention

The present invention relates to an improved scooter, and more particularly to a scooter in compliance with the requirements of a simple, smooth, power-saving, stable and safe ergonomic design, and the scooter comes with a unique operation and driving mode to achieve the effects of providing a recreational sport with fun and serving as a transportation tool.

2. Description of the Related Art

With reference to FIG. 1 for a conventional scooter, the conventional scooter comprises a frame 10, a front wheel 11, a rear wheel 12, and a stem 13, wherein the front wheel 11 is pivotally coupled to a front end of the frame 10 through a front fork 111, a rear wheel 12 is pivotally coupled to a rear end of the frame 10, and a lower end of the stem 13 is coupled to the front fork 111, and a handle 131 is installed at an upper end of the stem 13. When the scooter is used, an operator holds the handle 131 by both hands to operate the stem 13 and the front wheel 11 for controlling a driving direction, and stands on the frame 10 with one leg and kicks on the floor with another leg, such that the scooter can be glided and moved freely. As the gliding speed slows down gradually, the operator has to keep kicking on the floor to resupply a motive force for a reciprocal operation and maintain the speed of the scooter. The kick scooter has the drawbacks of a limited kicking speed, a low balance, a poor stability, and a monotonous exercise that exhausts the operator's leg easily.

In view of the shortcomings of the prior art, manufacturers developed a power scooter as shown in FIG. 2, and the power scooter comprises pedals 14 pivotally installed onto a rear end of the frame 10, a suspension arm 141 installed under the pedal 14, a first driving wheel 142 pivotally installed at the suspension arm 141, a second driving wheel 15 installed at a coaxial position of a rear wheel 12 and rotated in a single direction, a guide wheel 16 installed onto the frame 10 and behind the second driving wheel 15, an elastic element 17 installed at a front end of the frame 10, a pulley 18 installed at a rear end of the elastic element 17, a driving chain 19 with an end fixed to the rear end of the frame 10 and installed around the first driving wheel 142, the second driving wheel 15, the guide wheel 16 and the pulley 18 sequentially; such that a user stands on the frame 10 by a leg, and steps on the upper and lower pedals 14, and the first driving wheel 142 can pull the driving chain 19 according to the front and back swings of the suspension arm 141, and the second driving wheel 15 and the coaxial rear wheel 12 are driven to rotate, and the pulling effect of the elastic element 17 operated together with the single-direction rotation of the second driving wheel 15 drives the pedals 14 to move up and down reciprocally to drive the rear wheel 12 to move the scooter, so as to achieve the effect of gliding the scooter. Although this design provides a higher speed, the power scooter still has the drawbacks of a low balance, a poor stability, and a monotonous exercise that exhausts user's legs easily.

SUMMARY OF THE INVENTION

It is a primary objective of the present invention to overcome the shortcomings of the prior art by providing an improved scooter in compliance with the requirements of a simple, smooth, power-saving, stable and safe ergonomic design, and the scooter comes with a unique operation and driving mode and achieves the effects of providing a recreational sport with fun as well as a transportation means.

To achieve the foregoing objective, the present invention provides an improved scooter comprising a frame, a front wheel, a rear wheel, a stem, a handle, left and right pedal devices, left and right first driving devices and a second driving device, wherein the left and right first driving devices are driven by the left and right pedal devices respectively for solely or jointly driving the second driving devices, and the driven second driving devices can drive the rear wheel to rotate and roll forward, such that the front and rear wheels can jointly drive the scooter to move forward. Users can pedal the pedal device(s) by one leg or both legs alternately to operate the scooter. The scooter not only complies with a simple, smooth, power-saving, stable and safe ergonomic design, but also comes with a unique operation and driving mode and achieves the effects of providing a recreational sport with fun as well as a transportation tool.

DETAILED DESCRIPTION OF THE PREFERRED EMBODIMENTS

To make it easier for our examiner to understand the objects, effects and advantages of the present invention, we use preferred embodiments with related drawings for the detailed description of the present invention as follows.

Figure 1:
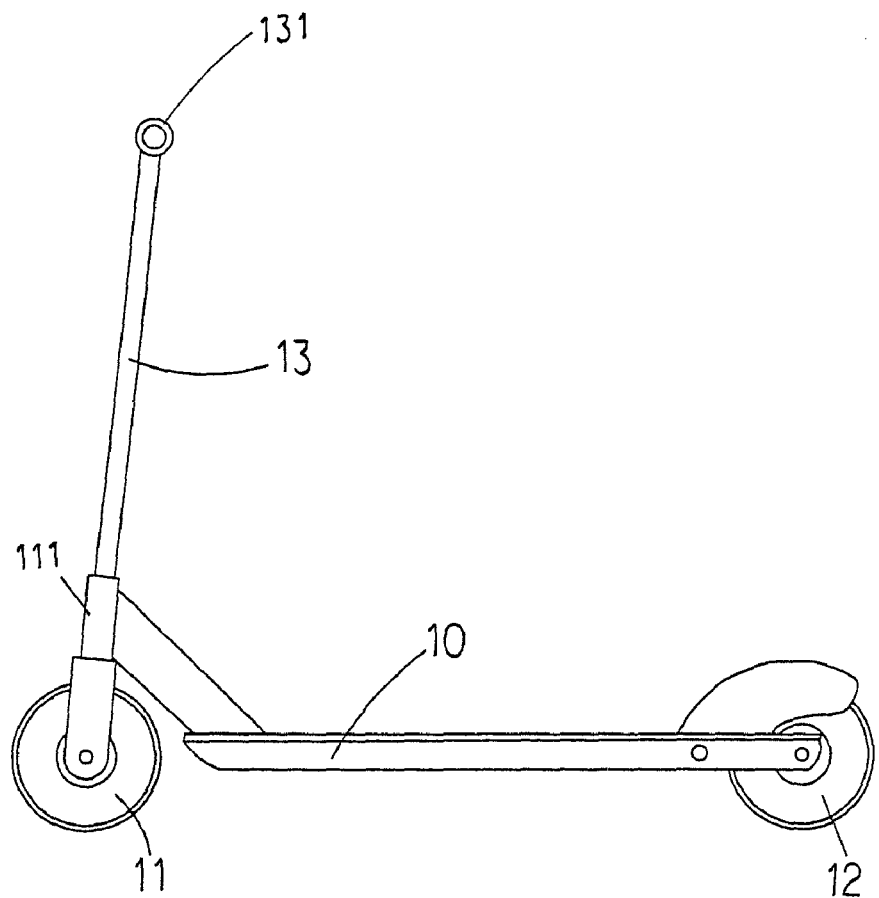
FIG. 1 is a schematic planar view of a conventional scooter.
Figure 2:
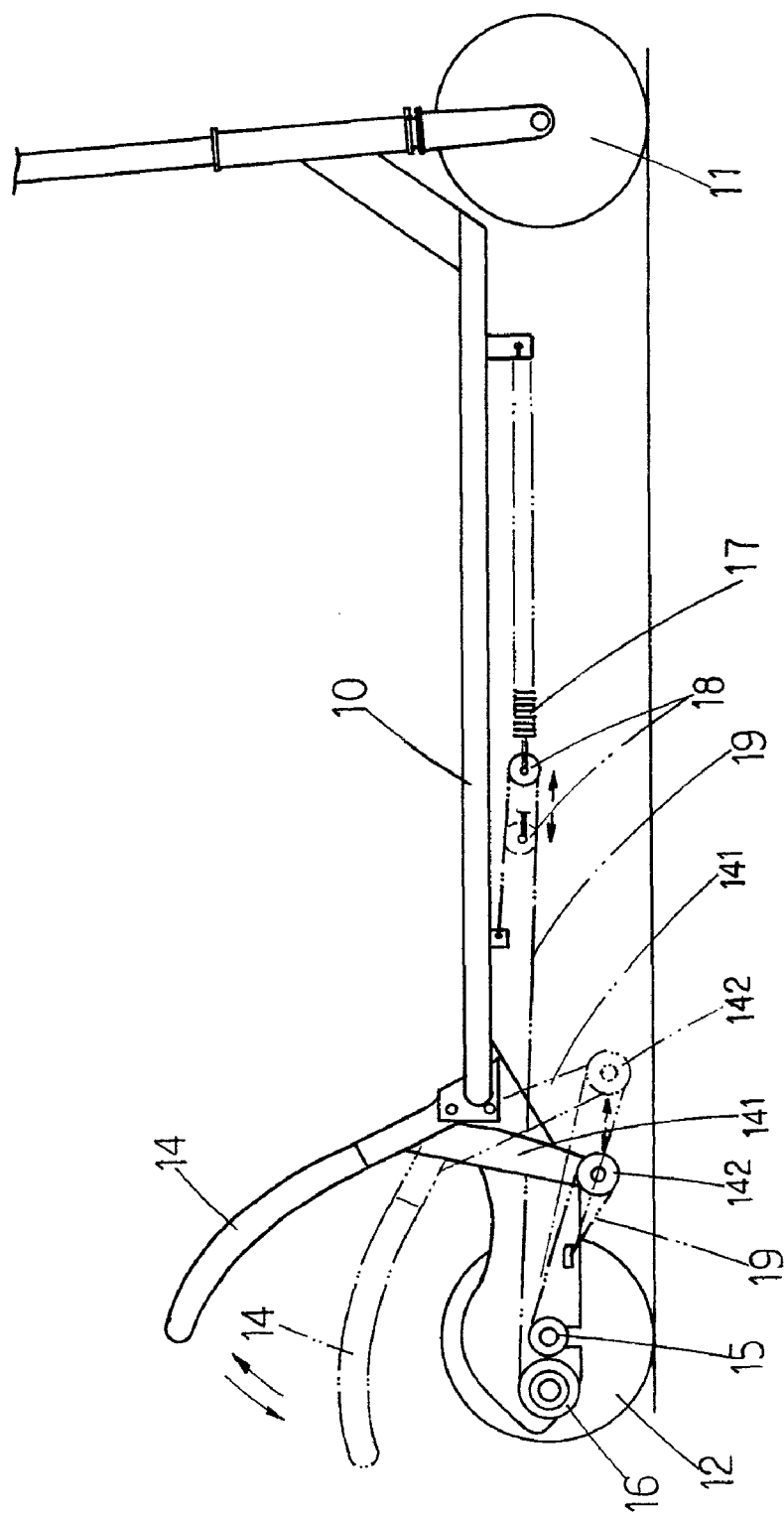
FIG. 2 is a schematic planar view of a conventional power scooter.
Figure 3:
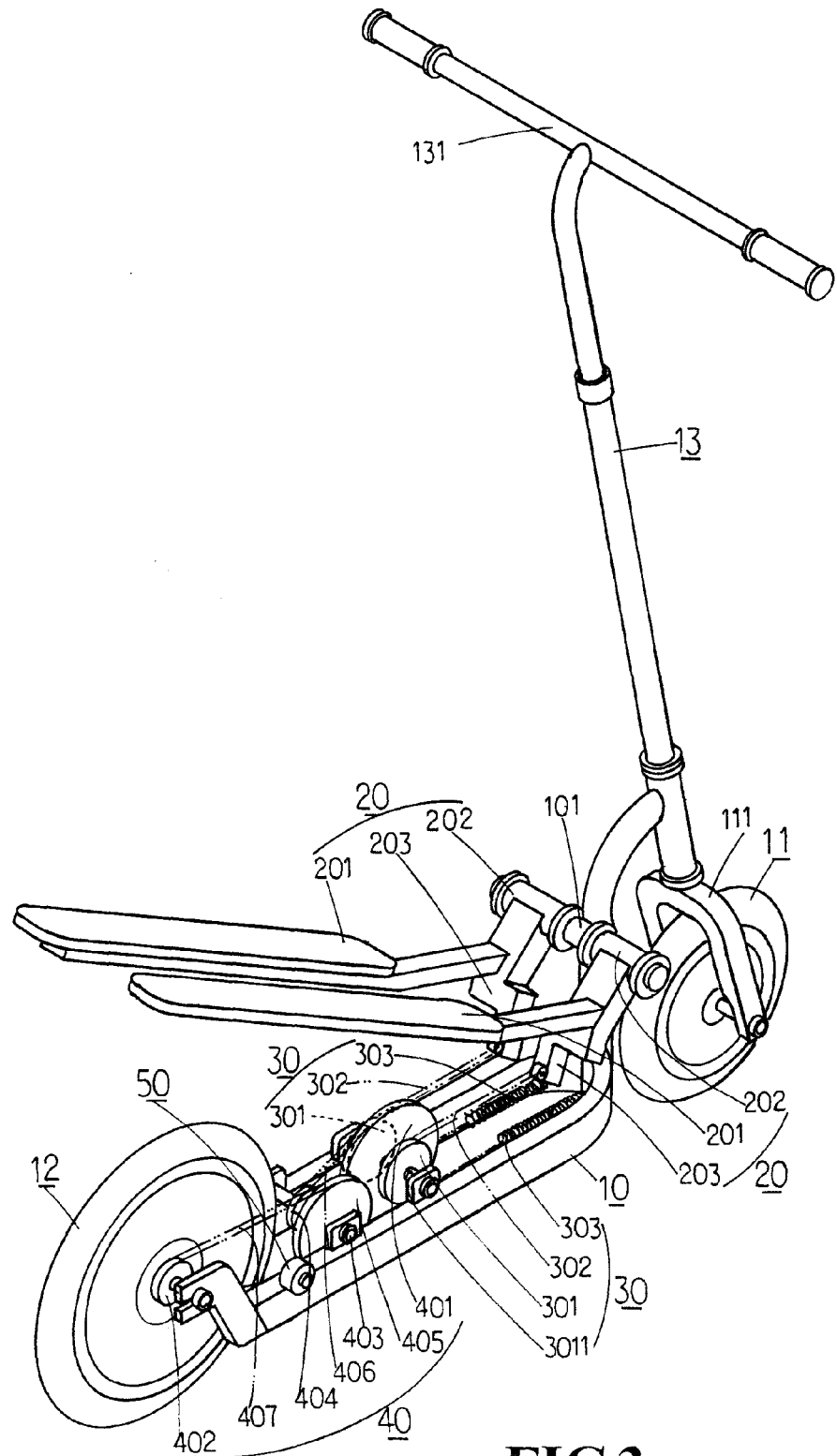
FIG. 3 is a perspective view of a scooter in accordance with a preferred embodiment of the present invention.
Figure 4:
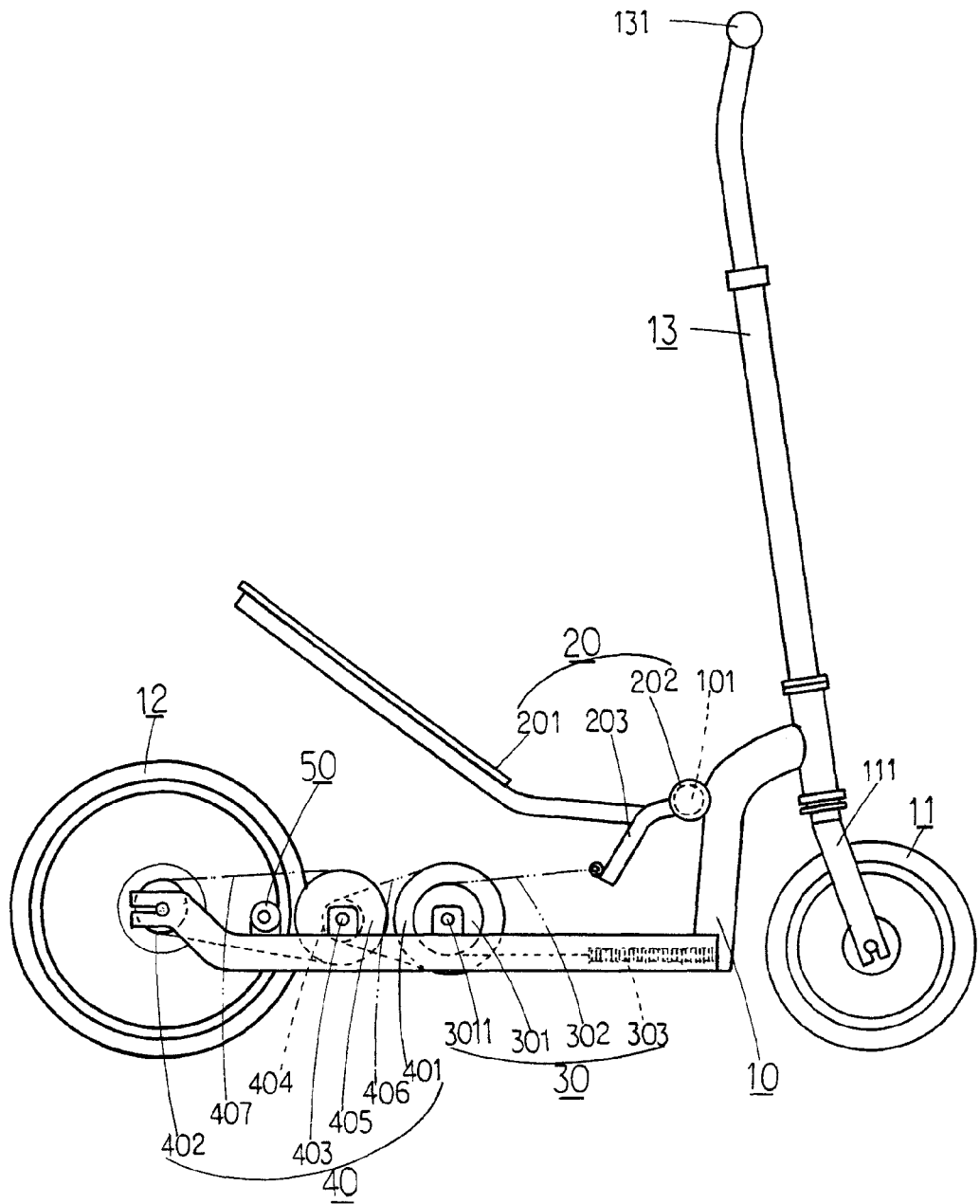
FIG. 4 is a front view of FIG. 3.
Figure 5:
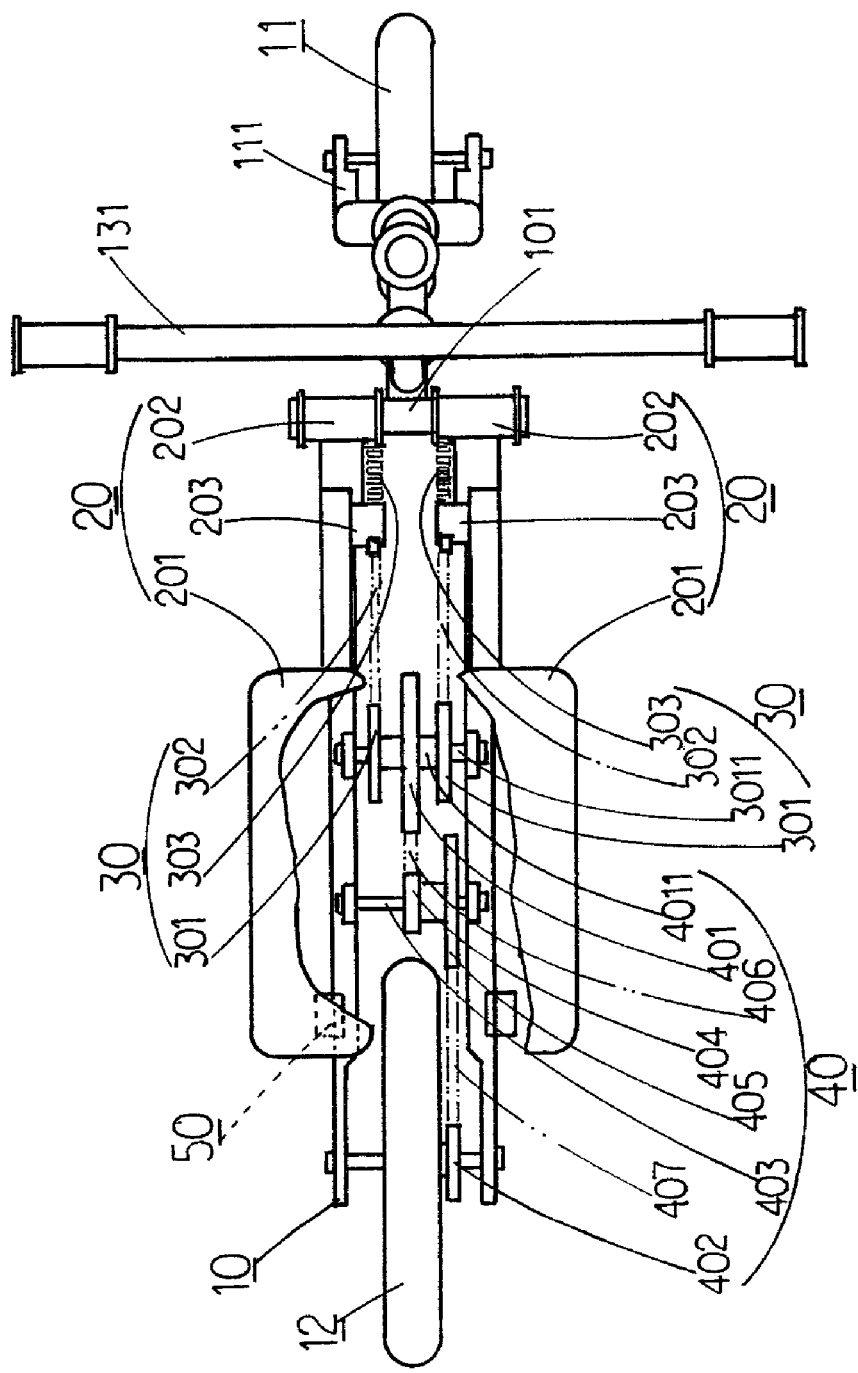
FIG. 5 is a top view of FIG. 3.

With reference to FIGS. 3 to 5 for an improved scooter, the scooter comprises: a frame 10, whose front end has a front wheel 11 pivotally connected to the front end through a front fork 111, and whose rear end has a rear wheel 12, wherein the frame 10 includes a stem 13 connected to an upper end of the front fork 111 and a handle 131 connected to an upper end of the stem 13; left and right pedal devices 20 pivotally coupled to both sides of the frame 10 respectively, and each pedal device 20 having a carrier 201 provided for a user's leg to stand on it, a rotating body 202 and a swing body 203 disposed at an end of the carrier 201, and rotatably and pivotally coupled to a transverse pivot 101 at a front end of the frame 10, such that the integrally combined carrier 201 and swing body 203 can perform up, down, front and rear swings; left and right first driving devices 30, corresponding to the left and right pedal devices 20 respectively, and each having a first driving wheel 301, a first driving belt 302 and a position restoring element 303, wherein the first driving wheel 301 is driven in one direction and free wheels in an opposing direction and installed onto the frame 10 by a pivot 3011, and the first driving belt 302 is installed around the first driving wheel 301, and an end of the first driving belt 302 is fixed to the swing body 203 of the pedal device 20, and another end of the first driving belt 302 is pulled to the frame 10 by the position restoring element 303, such that the carrier 201 of the pedal device 20 normally has an up-swing force; a second driving device 40, driven by the left and right first driving devices 30 to drive the rear wheel 12 to rotate and roll, and comprising a second active driving wheel 401 coaxial with the first driving wheel 301 of the left and right first driving devices 30, a second passive driving wheel 402 coaxial with the rear wheel 12, a driving belt (not shown in the figure) installed around the second active driving wheel 401 and the second passive driving wheel 402, or at least one middle shaft 403 installed at a position of the frame 10 and between the second active driving wheel 401 and the second passive driving wheel 402, and a transmission wheel 404, 405 installed onto the middle shaft 403. With the transmission of the driving belts 406, 407, the motive force produced by the rotation of the second active driving wheel 401 can be transmitted to the second passive driving wheel 402 and the rear wheel 12.

In addition, the first driving wheel 301 of the left and right first driving devices 30 can be installed to an axle bushing 4011 that is coupled to the second active driving wheel 401 of the second driving device (as shown in FIG. 5), so that after the pivot 3011 is passed through the axle bushing 4011 and fixed to the frame 10, the left and right first driving wheels 301 rotate as free wheels when rotated in one direction, wherein the second active driving wheel 401 is driven by the first driving wheels 301 to rotate driving wheel 401 if the respective rotation direction of the first driving wheels 301 is clockwise, or the second active driving wheel 401 is idled if there is no rotation or the respective rotation direction of the first driving wheels 301 is counterclockwise.

The frame 10 with the installed stop body 50 corresponds to the left and right pedal devices 20, such that a position limit effect is provided for the up-swinging carrier 201.

Figure 6:
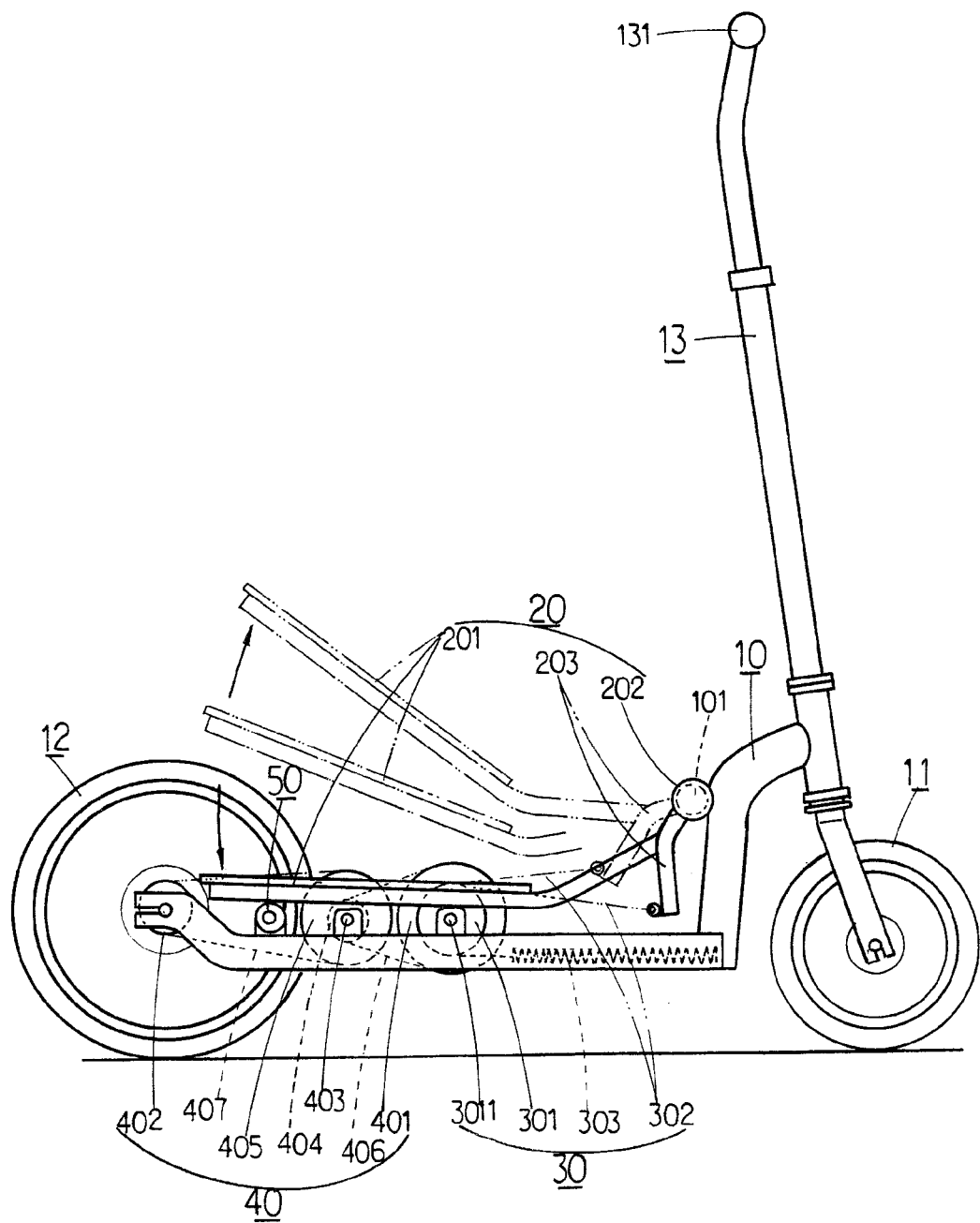
FIG. 6 is a schematic planar view of a using status of FIG. 3.

With reference to FIG. 6 and the structure of the present invention, the rotating body 202 of the left and right pedal devices 20 is rotated freely at the transverse pivot 101 of the frame 10, so that the integrally combined carrier 201 and swing body 203 can perform up, down, front and rear swings. After both ends of the first driving belt 302 of the left and right first driving devices 30 installed around the first driving wheel 301 are pulled to the position restoring element 303 and corresponding to the swing body 203 of the pedal device 20, the carrier 201 can normally have the up-swing force. When use, an operator holds the handle 131 by both hands to control the driving direction, and stands on the left and right carriers 201 by both legs respectively. With a down-stepping operation, the swing body 203 will pull the first driving belt 302 to rotate the first driving wheel 301 clockwise. If the leg is lifted, the carrier 201 will be pulled back to the up-swing position by the first driving belt 302 and the position restoring element 303 automatically to get ready for the next down-stepping operation. Since the first driving wheel 301 of the first driving device 30 is rotated in a single direction like a free wheel, a motive force will be produced if the first driving wheel 301 rotates clockwise, and no motive force will be produced in an idle rotation if the first driving wheel 301 rotates counterclockwise. When the carrier 201 is stepped down, the clockwise-rotating first driving wheel 301 will drive the second active driving wheel 401 of the second driving device 40 to rotate directly. When the carrier 201 resumes its up-swing position, the first driving belt 302 pulled to restore its position by the position restoring element 303 will drive the first driving wheel 301 to rotate in an opposite direction, and thus resulting in an idle rotation that will not drive the second active driving wheel 401 to rotate. Since the second active driving wheel 401 of the second driving device 40 is driven to rotate, transmission components such as the driving belts 406, 407 and the transmission wheels 404, 405 drive the second passive driving wheel 402 to rotate the rear wheel 12 coaxial with the second passive driving wheel 402. With the front wheel 11, the scooter of the present invention can be glided smoothly.

Since the left and right first driving wheels 301 are driven to rotate in a single direction like free wheels, a clockwise rotation of the left and right first driving wheels 301 can drive the second active driving wheel 401 to rotate, and a counter-clockwise rotation of the left and right first driving wheels 301 or maintaining the left and right first driving wheels 301 still will give an idle rotation that provides no motive force. In other words, the left and right carriers 201 can drive the first driving wheel 301 to rotate clockwise and also rotate the second active driving wheel 401 together with the rear wheel 12 to drive the scooter to move forward when the left and right carriers 201 are stepped downward. When the left and right carriers 201 are swung upward, the first driving wheel 301 is rotated idly and will not drive the second active driving wheel 401. When the left and right carriers 201 remain still, the first driving wheel 301 will not interfere with the still condition of the second active driving wheel 401. The operator can stand on the left and right carriers 201 by both legs respectively to perform the up and down swing movements to the left and right carriers 201, or step the carrier 201 to its lowest point by one leg, and step the other carrier 201 by another leg. The scooter of the present invention provides a diversified and convenient operation.

In other words, the aforementioned structure of the present invention allows an operator to hold the handle 131 by both hands, and stand on the left and right carriers 201 respectively by both legs, such that both legs can apply forces alternatively to step the left and right carriers 201, or step on a corresponding carrier 201 by one leg to apply reciprocal forces to achieve the effect of driving the scooter to move forward. The invention not only complies with the simple, convenient, smooth and diversified ergonomic requirements and provides a unique operation and driving mode, but also achieves the effect of providing a recreational sport with fun. Of course, the operator can operate the scooter by stepping on the carrier (s) by both legs or by one leg according to the road condition to achieve the effect of riding the scooter with a balanced stability, a constant speed and a safe effect.

What is claimed is:

1. An improved scooter, comprising a frame, whose front end having a front wheel pivotally coupled to a front fork, and whose rear end having a rear wheel pivotally coupled thereto, and an upper end of the front fork being coupled to a stem, and an upper end of the stem having a handle, characterized in that:

left and right pedal devices are installed on both sides of the frame respectively, and each pedal device includes a carrier, and a rotating body and a swing body are disposed at an end of the carrier, and the rotating body is rotatably and pivotally coupled to a transverse pivot at a front end of the frame, such that when the rotating body is rotated, the integrally combined carrier and swing body can perform up, down, front and rear swings;

left and right first driving devices, each includes a first driving wheel, a first driving belt and a position restoring element installed corresponding to the left and right pedal devices respectively, and the first driving wheel is mounted onto the frame and driven in one direction and free wheels in an opposing direction, and the first driving belt is installed around the first driving wheel, and an end of the first driving belt is installed to the swing body of a respective pedal device, and another end of the first driving belt is pulled to the frame through the position restoring element, such that the carrier of the respective pedal device normally has an up-swinging force; and a second driving device is driven by the left and right first driving devices to rotate and roll the rear wheel, and comprises at least one second active driving wheel coaxial with the left and right first driving wheels, a second passive driving wheel coaxial with the rear wheel, and a driving belt installed between the second active driving wheel and the second passive driving wheel.

2. The improved scooter of claim 1, further comprising at least one middle shaft wherein at the frame between the second active driving wheel of the second driving device and the second passive driving wheel, and the middle shaft having a transmission wheel installed thereon, and a driving belt being installed around the transmission wheel, the second active driving wheel, and the second passive driving wheel.

3. The improved scooter of claim 1, wherein the left and right first driving wheels are installed and coupled to an axle bushing of the second active driving wheel.

4. The improved scooter of claim 1, wherein the frame includes a stop body disposed corresponding to the left and right pedal devices for limiting and blocking the lower swinging carrier.

* * * * *